(12) United States Patent
Onomatsu

(10) Patent No.: US 10,223,043 B2
(45) Date of Patent: Mar. 5, 2019

(54) PRINTER AND PRINTING SYSTEM

(71) Applicant: Funai Electric Co., Ltd., Osaka (JP)

(72) Inventor: Takehiro Onomatsu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 15/726,430

(22) Filed: Oct. 6, 2017

(65) Prior Publication Data

US 2018/0101336 A1  Apr. 12, 2018

(30) Foreign Application Priority Data

Oct. 7, 2016  (JP) .................................. 2016-199087

(51) Int. Cl.
| | |
|---|---|
| *G06F 3/12* | (2006.01) |
| *H04N 1/00* | (2006.01) |
| *G06Q 20/14* | (2012.01) |
| *H04N 1/333* | (2006.01) |
| *B41J 29/38* | (2006.01) |
| *B41J 2/01* | (2006.01) |

(52) U.S. Cl.
CPC .............. *G06F 3/1212* (2013.01); *B41J 2/01* (2013.01); *B41J 29/38* (2013.01); *G06F 3/1203* (2013.01); *G06F 3/129* (2013.01); *G06F 3/1236* (2013.01); *G06F 3/1239* (2013.01); *G06F 3/1287* (2013.01); *G06F 3/1289* (2013.01); *G06Q 20/14* (2013.01); *H04N 1/00344* (2013.01); *H04N 1/00973* (2013.01); *H04N 1/33361* (2013.01); *G06F 3/1219* (2013.01); *H04N 2201/0025* (2013.01); *H04N 2201/0094* (2013.01)

(58) Field of Classification Search
CPC . B41J 29/38; B41J 2/01; G06F 3/1203; G06F 3/1212; G06F 3/1219; G06F 3/1236; G06F 3/1239; G06F 3/1287; G06F 3/1289; G06F 3/129; G06Q 20/14; H04N 1/00344; H04N 1/00973; H04N 1/33361; H04N 2201/0025; H04N 2201/0094
USPC ...... 358/1.15, 1.14, 1.9, 1.13, 1.6, 1.16, 1.2; 399/27, 67, 79, 341, 81
See application file for complete search history.

(56) References Cited

U.S. PATENT DOCUMENTS

| | | | | |
|---|---|---|---|---|
| 6,157,465 A | * | 12/2000 | Suda ..................... | G06F 3/1204 358/1.15 |
| 2007/0109586 A1 | * | 5/2007 | Yamada ................. | G06F 3/121 358/1.14 |

(Continued)

FOREIGN PATENT DOCUMENTS

| | | |
|---|---|---|
| EP | 2725480 A2 | 4/2014 |
| JP | 2001-306315 A | 11/2001 |
| WO | 2014/120199 A1 | 8/2014 |

OTHER PUBLICATIONS

Extended European Search Report issued in corresponding European Patent Application No. 171952021 dated Mar. 7, 2018 (9 pages).

(Continued)

*Primary Examiner* — Negussie Worku
(74) *Attorney, Agent, or Firm* — Osha Liang LLP

(57) ABSTRACT

A printer includes a communication circuit that communicates with an external device, a printing instruction receiver that receives a printing instruction, a controller that determines a printing amount based on a state of the communication with the external device, and a printing unit that executes printing based on the printing instruction and the printing amount.

18 Claims, 16 Drawing Sheets

(56) References Cited

U.S. PATENT DOCUMENTS

| | | | | |
|---|---|---|---|---|
| 2008/0204790 A1* | 8/2008 | Kondo | ............... | G06F 3/1213 |
| | | | | 358/1.15 |
| 2009/0086264 A1* | 4/2009 | Yoshida | ............. | H04N 1/00222 |
| | | | | 358/1.15 |
| 2009/0096673 A1* | 4/2009 | Nakajima | ............... | H01Q 3/34 |
| | | | | 342/374 |
| 2009/0096866 A1* | 4/2009 | Onomatsu | .......... | H04N 1/00291 |
| | | | | 348/61 |
| 2010/0309514 A1* | 12/2010 | Tanaka | .................... | G06F 3/121 |
| | | | | 358/1.15 |
| 2012/0194864 A1* | 8/2012 | Oshima | ................ | G06F 3/1204 |
| | | | | 358/1.15 |
| 2015/0220818 A1* | 8/2015 | Hosokawa | ........... | G06K 15/021 |
| | | | | 358/1.15 |
| 2015/0227327 A1* | 8/2015 | Akiyama | ............. | G06F 3/1219 |
| | | | | 358/1.15 |
| 2015/0277817 A1* | 10/2015 | Tsujioka | ............... | G06F 3/1234 |
| | | | | 358/1.14 |
| 2016/0134764 A1* | 5/2016 | Oguma | ................ | G06F 3/1239 |
| | | | | 358/1.14 |
| 2016/0266851 A1* | 9/2016 | Kanamoto | ........... | G06F 3/1206 |
| 2016/0274841 A1* | 9/2016 | Suzuki | .................. | G06F 3/1222 |
| 2016/0316089 A1* | 10/2016 | Kamoi | ............. | H04N 1/00962 |
| 2018/0097959 A1* | 4/2018 | Kamoi | ............. | H04N 1/00204 |
| 2018/0316823 A1* | 11/2018 | Kawai | ................ | H04N 1/32797 |

OTHER PUBLICATIONS

Office Action issued in European Application No. 17195202.1, dated Nov. 27, 2018 (7 pages).

* cited by examiner

FIG. 6

| ID | Password | Address | Telephone no. | Email address | Credit-card no. | Printer serial no. |
|---|---|---|---|---|---|---|
| 001 | ****** | YY-Z XX-chō, Higashiōsaka-shi, Osaka | 06--** | aaa@bbb.com | aaaa-aaaa-aaaa-aaaa | P0001 |
| 002 | ****** | A-Y BB-ku, Ōsaka-shi, Osaka | 06--** | bbb@bba.com | bbbb-bbbb-bbbb-bbbb | P0002 |
| 003 | ****** | DD-E CC-chō, Higashiōsaka-shi, Osaka | 06--** | ccc@bca.com | cccc-cccc-cccc-cccc | P0003 |
| ⋮ | ⋮ | ⋮ | ⋮ | ⋮ | ⋮ | ⋮ |

FIG. 7

| Printer serial number | Contract plan | Ink serial number |
|---|---|---|
| P0001 | Plan A (1,000 sheets per month) | I0001 |
| P0002 | Plan C (4,000 sheets per month) | I0002 |
| P0003 | Plan B (2,000 sheets per month) | I0003 |
| ⋮ | ⋮ | ⋮ |

FIG. 9

| Printing time | Sheet size | Number of sheets | Color / black and white | Printing success/failur |
|---|---|---|---|---|
| ⋮ | ⋮ | ⋮ | ⋮ | ⋮ |
| 2016/05/21 10:30 | A4 | 10 | Color | Success |
| 2016/05/21 12:35 | A4 | 12 | Black and white | Success |
| 2016/05/21 12:53 | A3 | 2 | Black and white | Failure (1) |
| 2016/05/21 13:12 | A4 | 25 | Black and white | Success |
| 2016/05/21 13:20 | A3 | 1 | Color | Success |
| ⋮ | ⋮ | ⋮ | ⋮ | ⋮ |

FIG. 10

| Black | Cyan | Magenta | Yellow |
|---|---|---|---|
| 69% | 32% | 56% | 21% |

PRINTER AND PRINTING SYSTEM

BACKGROUND

Technical Field

The present invention generally relates to a printer that communicates with an external device via a network.

Related Art

Conventional multifunctional devices communicate with a server via a network. Conventional billing systems bill a deliverable of printing each time the multifunctional devices perform printing (see patent literature 1).

Patent Literature 1: JP 2001-306315 A

In such a billing system, generally, the multifunctional device (also "printer" hereinbelow) receives license authentication from the server each time it communicates with the server, performing printing in a situation where starting printing is authorized and not performing printing in a situation where starting printing is not authorized. That is, the conventional printer cannot perform printing unless information is received from the server indicating printing authorization after a user performs an operation of starting printing. Because of this, in a situation of the printer being in a condition of not being able to communicate with the server, a situation of a communication speed with the server being slow, or the like, there is a situation where it takes time until printing is executed even though there is a remaining amount in a number of contracted sheets (number of printable sheets) in the printer.

SUMMARY

One or more embodiments of the present invention provide a printer that can start printing without taking up time.

A printer according to one or more embodiments of the present invention includes a communication circuit that communicates with an external device, a printing instruction receiver that acquires a printing instruction, a controller that determines a printing amount based on a state of the communication, and a printing unit that executes printing based on the printing instruction and the printing amount.

As a result, printing can be executed based on the printing instruction and the printing amount determined according to the state of communication with the external device; therefore, printing can be executed without taking up time.

In a printer according to one or more embodiments of the present invention, for example, a storage that stores first printing information may be provided. The communication circuit receives second printing information from the external device and the controller determines the printing amount based on any one from among the first printing information and the second printing information.

As a result, the printing amount is determined based on any one from among the first printing information stored by the printer and the second printing information acquired from the external device; therefore, the printing amount can be appropriately determined.

In a printer according to one or more embodiments of the present invention, for example, the controller may determine the printing amount based on the first printing information during a time until the communication circuit acquires the second printing information.

As result, printing can be executed without taking up time.

In a printer according to one or more embodiments of the present invention, for example, the first printing information may include a first predetermined value representing a number of printable sheets and the printing unit, in a situation where the controller determines that a value of the first predetermined value is no less than a predetermined value, may perform printing based on the determination.

As a result, printing can be executed in a situation where the first printing information stored by the storage is no less than the first predetermined value.

In a printer according to one or more embodiments of the present invention, for example, the determination may be performed for each execution of the printing.

As a result, printing can be executed in an amount corresponding to the first predetermined value included in the first printing information.

In a printer according to one or more embodiments of the present invention, for example, the controller may update the first predetermined value based on a number of times of the printing.

In a printer according to one or more embodiments of the present invention, for example, the updated value may be a value where the number of times of the printing is subtracted from the first predetermined value.

As a result, execution of printing can be stopped if the first predetermined value included in the first printing information becomes less than the predetermined value. Therefore, the printer executing printing more than is necessary can be decreased even in a situation where the printer does not acquire the second printing information from the external device.

In a printer according to one or more embodiments of the present invention, for example, the controller may send the updated value to the external device based on a request from the external device.

In a printer according to one or more embodiments of the present invention, for example, the second printing information may include printability information and the printing unit may execute the printing in a situation where the printability information includes printable-status information and not execute the printing in a situation where the printability information includes non-printable-status information.

In a printer according to one or more embodiments of the present invention, for example, the communication circuit may acquire the printability information, which includes a second predetermined value, from the external device, and the controller may update the updated value to the second predetermined value.

By this, if a communication connection is established with the external device, the decreased first predetermined value of the first printing information can be updated to the second predetermined value.

In a printer according to one or more embodiments of the present invention, for example, the printability information may include the printable-status information if the second predetermined value is no less than a predetermined value and include the non-printable-status information if the second predetermined value is less than the predetermined value.

According to one or more embodiments of the present invention, a printing system includes a terminal device that transmits a printing instruction, a server, and a printer that receives the printing instruction. The printer that communicates with the external device. The printer determines a printing amount based on a state of the communication with the external device. The printer executes printing based on the printing instruction and the printing amount.

One or more embodiments of the present invention can not only be realized as a printer including such characteristic processing units but also as a printing method or printing management method whose steps are processing executed by the characteristic processing units included in the printer. Moreover, it can also be realized as an information terminal device such as a smartphone provided with the characteristic processing units included in the printer. Moreover, it can also be realized as a program for causing a computer to function as the characteristic processing units included in the printer or a program for causing a computer to execute the characteristic steps included in the printing method or the printing management method. Moreover, it is needless to say that such a program can be distributed via a computer-readable, non-temporary medium such as a CD-ROM (compact disc read-only memory) or a communication network such as the internet.

According to one or more embodiments of the present invention, printing can be executed without taking up time.

BRIEF DESCRIPTION OF DRAWINGS

FIG. 6 is a diagram illustrating an example of personal information recorded in a storage of the server according to one or more embodiments of the present invention.

FIG. 7 is a diagram illustrating an example of printer information stored in the storage of the server according to one or more embodiments of the present invention.

FIG. 9 is a diagram illustrating an example of a printing history according to one or more embodiments of the present invention.

FIG. 10 is a diagram illustrating an example of ink parameters according to one or more embodiments of the present invention.

DETAILED DESCRIPTION

Embodiments of the present invention will be described in detail below with reference to the drawings. In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

1-1. CONFIGURATION OF PRINTING SYSTEM

Figure 1:
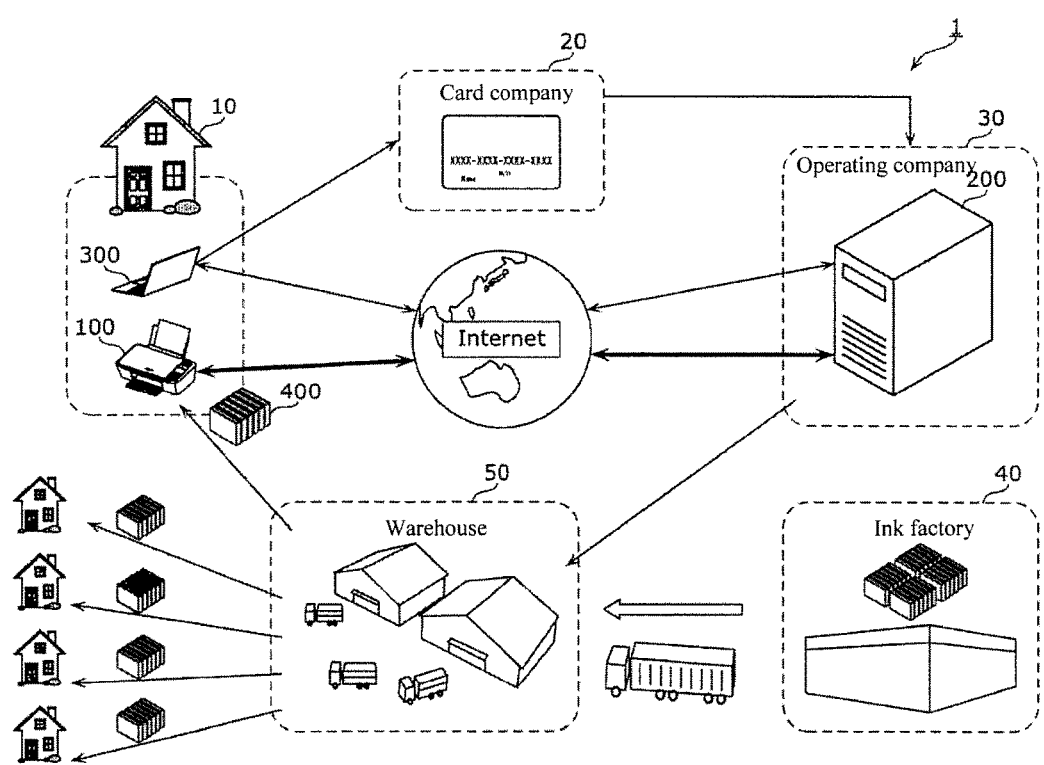
FIG. 1 is a diagram illustrating a summary of a printing system overall according to one or more embodiments of the present invention.

As shown in FIG. 1, a printing system 1 according to one or more embodiments of the present invention includes a printer 100 and a server 200.

FIG. 1 is a diagram illustrating a summary of a printing system overall according to one or more embodiments of the present invention. In the printing system 1, in a situation where no ink 400 is set in the printer 100 (for example, an inkjet printer), which a user is using, or a remaining amount of the ink 400 set in the printer 100 is less than a predetermined amount, the ink 400 is automatically delivered to a residence 10 where this user resides.

As illustrated in FIG. 1, the printing system 1 includes the printer 100; as an external device, the server 200; and a terminal device 300 each being connected via a network. Between the printer 100 and the terminal device 300, a wireless connection or a wired connection may be directly established, a wireless connection or a wired connection may be established via a router, or a communication connection may be established via the internet, whether the connection be wireless or wired. Between the printer 100 and the server 200 and between the terminal device 300 and the server 200, a communication connection is established via a network, whether the connection be wireless or wired. The network may be a general-purpose network such as the internet or a dedicated network. The network may be a local network.

In the example of FIG. 1, the printer 100 and the terminal device 300 are disposed at the residence 10 where the user resides and the server 200 is disposed at an operating company 30 of the printing system 1. Because no ink 400 is set in the printer 100 in a situation of first-time use, a request for the ink 400 is made to the server 200. The printer 100 similarly makes a request for the ink 400 to the server 200 in the situation where the remaining amount of the ink is less than the predetermined amount. In a situation where the request for the ink 400 is received, the server 200 instructs a logistics system 50 to deliver the ink 400 corresponding to this printer 100 to the residence 10 where the user using this printer 100 resides.

The printing system 1 may further include a card company 20, an ink factory 40, and the logistics system 50. The card company 20 is a company that mediates payment of a usage fee of the printer 100 by the user to the operating company 30. The card company 20 is, for example, a company that deals with credit cards. The ink factory 40 is a factory where ink to be disposed in the printer 100 is produced. Specifically, the ink factory 40 produces an ink cartridge, which is filed with ink 400. The logistics system 50 is a system for delivering the ink 400 produced at the ink factory 40 to the residence 10 of each user. The logistics system 50 delivers the ink 400, which is moved in advance to a warehouse from the ink factory 40, to the residence 10, which is an order destination, according to an order of the ink 400 from the operating company 30. The logistics system 50 may collect an empty ink cartridge from the residence 10 when delivering the ink 400 to the residence 10. The logistics system 50 requests the ink factory 40 to produce the ink 400 according to an inventory status of the warehouse.

1-2. CONFIGURATION OF PRINTER

Figure 2:
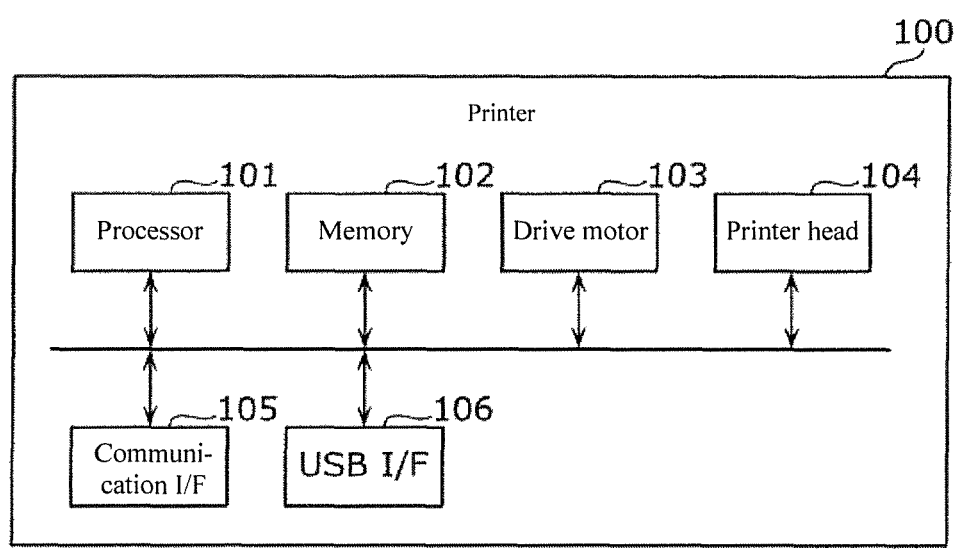
FIG. 2 is a block diagram illustrating an example of a hardware configuration of a printer according to one or more embodiments of the present invention.

A hardware configuration of the printer 100 is described using FIG. 2.

FIG. 2 is a block diagram illustrating an example of the hardware configuration of the printer.

As illustrated in FIG. 2, the printer 100 includes a processor 101, a memory 102, a drive motor 103, a printer head 104, a communication I/F 105, and an USB I/F 106.

The processor 101 is a processor that executes a control program stored in the memory 102 or the like.

The memory 102 is a nonvolatile storage region that holds the control program or the like.

The drive motor 103 is a motor used to move the printer head 104 to a predetermined position for paper feeding.

The printer head 104 is a head that sprays a predetermined amount of the ink.

The communication I/F 105 is a network interface that sends and receives data to and from another device via the network. The communication I/F 105 is, for example, a wireless LAN (local area network) interface conforming to IEEE 802.11a, b, g, or n. The communication I/F 105 may be, for example, a wired LAN interface conforming to an ethernet standard. The communication I/F 105 may be, for example, a wireless communication interface conforming to the Bluetooth (registered trademark) standard.

The USB I/F 106 is an interface conforming to a USB (universal serial bus) standard.

1-3. CONFIGURATION OF SERVER

Figure 3:
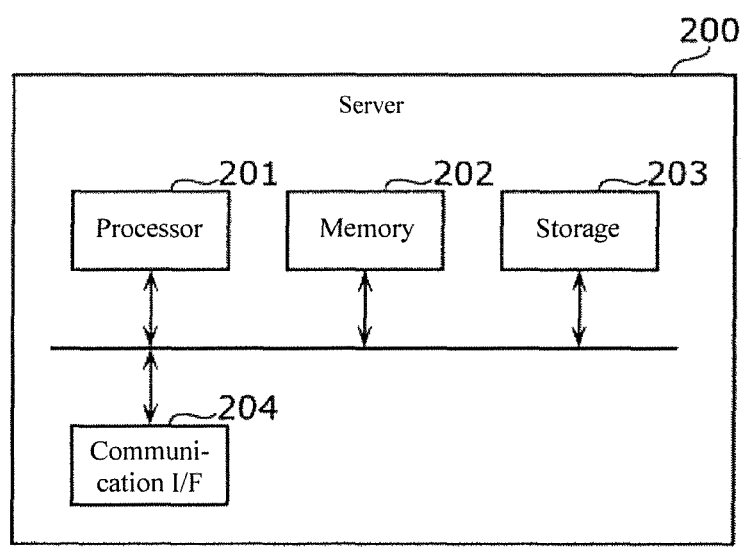
FIG. 3 is a block diagram illustrating an example of a hardware configuration of a server according to one or more embodiments of the present invention.

A hardware configuration of the server 200 is described using FIG. 3.

FIG. 3 is a block diagram illustrating an example of the hardware configuration of the server.

As illustrated in FIG. 3, the server 200 includes a processor 201, a memory 202, a storage 203, and a communication I/F 204.

The processor 201 is a processor that executes a control program stored in the storage 203 or the like.

The memory 202 is a volatile storage region used as a work area the processor 201 uses when executing the control program.

The storage 203 is a nonvolatile storage region that holds the control program and various types of data.

The communication I/F 204 is, for example, a wired LAN interface.

1-4. FUNCTIONAL CONFIGURATION OF PRINTING SYSTEM

Figure 4:
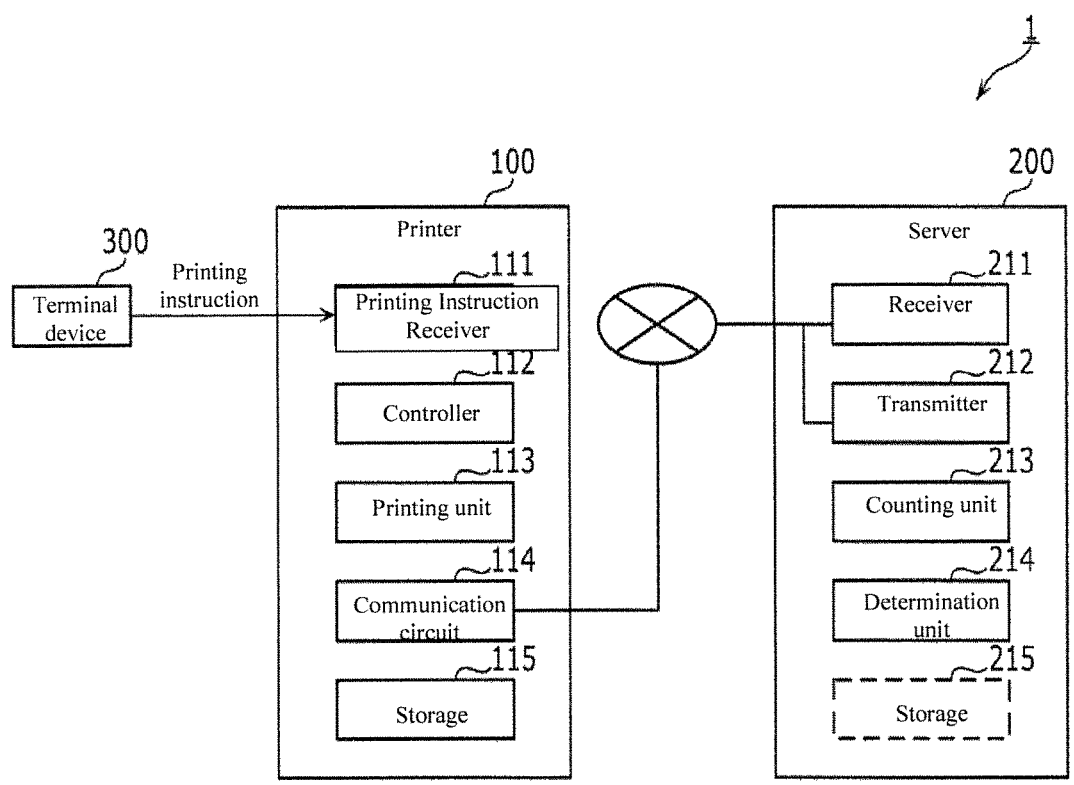
FIG. 4 is a block diagram illustrating an example of a functional configuration of the printing system according to one or more embodiments of the present invention.

Next, a functional configuration of the printing system 1 is described using FIG. 4.

FIG. 4 is a block diagram illustrating an example of the functional configuration of the printing system.

First, a functional configuration of the printer 100 is described.

As the functional configuration, the printer 100 includes a printing instruction receiver 111, a controller 112, a printing unit 113, a communication circuit 114, and a storage 115.

The printing instruction receiver 111 acquires a printing instruction. The printing instruction receiver 111 receives (acquires) the printing instruction from, for example, the terminal device 300. The printing instruction receiver 111 is realized by, for example, the processor 101, the memory 102, the communication I/F 105, the USB I/F 106, and the like.

The controller 112 determines a printing amount based on a state of communication with the server 200. Specifically, the controller 112 determines the printing amount based on one from among a printing margin as first printing information stored in the storage 115 and second printing information acquired from the server 200. The second printing information includes printability information indicating whether printing is possible.

The state of communication indicates a state where a connection with the server 200 is established or a state where no connection is established. The state of communication indicates a state where printable-status information is received from the server 200 or a state where no such information is received. Here, the printable-status information is information that is included in the printability information and indicates that printing is possible. The printability information may include non-printable-status information. That is, the printability information indicates printability in a situation of including the printable-status information and indicates non-printability in a situation of including the non-printable-status information.

Furthermore, the printing margin includes a first predetermined value indicating a number of sheets that the printer 100 can print even in a situation where no printability information is acquired by the printer 100 from the server when the printing instruction receiver 111 acquires the printing instruction. That is, the controller 112 determines the printing amount based on the printing margin during a time until the communication circuit 114 acquires printing authorization information.

The controller 112 updates the first predetermined value to an updated value based on a number of times of printing. The updated value is a value where the number of times of printing is subtracted from the first predetermined value. That is, when the printing unit 113 executes printing, the controller 112 subtracts the number of times printing is executed from a value of the printing margin held by the storage 115. The controller 112 sends the updated value to the server 200 based on a request from the server 200.

In a situation where the printability information, which includes a second predetermined value, is acquired by the communication circuit 114, the controller 112 updates the updated value to the second predetermined value. That is, the controller 112 updates the held value of the printing margin to the second predetermined value, which is for updating the printing margin the communication circuit 114 receives from the server 200.

The controller 112 determines that the first predetermined value is no less than a predetermined value. Specifically, the controller 112 determines whether the value of the printing margin held by the storage 115 is no less than 1 when the printing instruction receiver 111 acquires the printing instruction. This determination may be made each time printing is executed. That is, the controller 112 may make the above determination each time printing is performed for a predetermined number of sheets (one sheet in one or more embodiments of the present invention). The predetermined number of sheets may be, for example, one, two, three, or the like or no less than four. The controller 112 may make the above determination each time printing of a number of sheets according to the printing instruction is performed.

The controller 112 is realized by, for example, the processor 101, the memory 102, and the like.

The printing unit 113 executes printing based on the printing instruction and the printing amount. That is, the printing unit 113 executes printing according to the printing instruction based on the printing margin. Specifically, in the situation where the controller 112 determines that the first predetermined value of the printing margin is no less than the predetermined value, the printing unit 113 performs printing based on this determination. For example, the printing unit 113 executes printing according to the printing instruction in a situation where the controller determines that the value of the printing margin is no less than 1. The printing unit 113 executes printing if the printability information received by the communication circuit 114 includes the printable-status information indicating printability and does not execute printing if the printability information includes the non-printable-status information indicating non-printability. Specifically, the printing unit 113 executes printing because the controller 112 determines the value of the printing margin to be no less than 1 if the second predetermined value for updating the printing margin as the printability information is no less than 1. Meanwhile, the printing unit 113 does not execute printing if the second predetermined value as the printability information is 0 because the controller 112 determines the value of the printing margin to not be no less than 1.

That is, the printability information includes the printable-status information if the updated value is no less than the predetermined value and includes the non-printable-status information if the updated value is less than the predetermined value. Specifically, the printability information indicates printability if the second predetermined value is no less than 1 and indicates non-printability if this second predetermined value is 0.

The printing unit 113 is realized by, for example, the processor 101, the memory 102, the drive motor 103, the printer head 104, and the like.

Here, the storage 115 holds 0 as an initial value of the printing margin. Therefore, the printer 100 cannot execute printing unless the value of the printing margin is updated.

The communication circuit 114 communicates with the server 200 and receives the printability information from the server 200. The communication circuit 114 receives the second predetermined value as the printability information from the server 200. That is, the communication circuit 114 acquires the printability information including the second predetermined value from the server 200. The communication circuit 114 is realized by, for example, the processor 101, the memory 102, the communication I/F 105, and the USB I/F 106.

The storage 115 stores the printing margin. That is, the value of the printing margin is an integer no less than 0.

Furthermore, the storage 115 temporarily holds the value of the printing margin while receiving supply of power from a power plug that is not illustrated of the printer 100. That is, the value of the printing margin may be made to be 0 while the storage 115 is not receiving supply of power from the power plug.

Next, a functional configuration of the server 200 is described.

As the functional configuration, the server 200 includes a receiver 211, a transmitter 212, a counting unit 213, and a determination unit 214. The server 200 may be further provided with a storage 215.

The receiver 211 receives printing information indicating a status of printing executed in the printer 100. The printing information includes, for example, a printing history, printer parameters, ink parameters, and the like. The receiver 211 is realized by, for example, the processor 201, the memory 202, the storage 203, the communication I/F 204, and the like.

The counting unit 213 counts the number of sheets printed by the printer 100 based on the printing information received by the receiver 211. The counting unit 213, in a situation where, for example, the printing information indicates a status for each printing instruction, counts the number of printed sheets by summing numbers of sheets printed by this printer 100 for each printing instruction. The counting unit 213, in a situation where the printing information indicates a status for each sheet, counts the number of printed sheets by counting a number of statuses. The counting unit 213 is realized by, for example, the processor 201, the memory 202, and the storage 203.

The determination unit 214 determines whether the number of printed sheets counted by the counting unit 213 is less than a number of printable sheets associated with the printer 100. The determination unit 214 is realized by, for example, the processor 201, the memory 202, the storage 203, and the like.

The transmitter 212, in a situation where, as a result of the determination by the determination unit 214, the number of printed sheets counted by the counting unit 213 is less than the printable number of sheets, sends as the printability information a value of no less than 1 as the second predetermined value for updating the printing margin. The transmitter 212 is realized by, for example, the processor 201, the memory 202, the storage 203, the communication I/F 204, and the like.

The storage 215 stores the printing information the receiver 211 receives from the printer 100.

The terminal device 300 is an information terminal that accepts input from the user to initialize the printer 100 and output the printing instruction to the printer 100. The terminal device 300 is, for example, an information terminal such as a desktop PC, a laptop PC, a tablet terminal, or a smartphone.

1-5. OPERATIONS

Next, operations of the printing system 1 are described using FIGS. 5 to 10.

First, operations of each device configuring the printing system 1 in a situation where the printer 100 is initialized are described.

Figure 5:
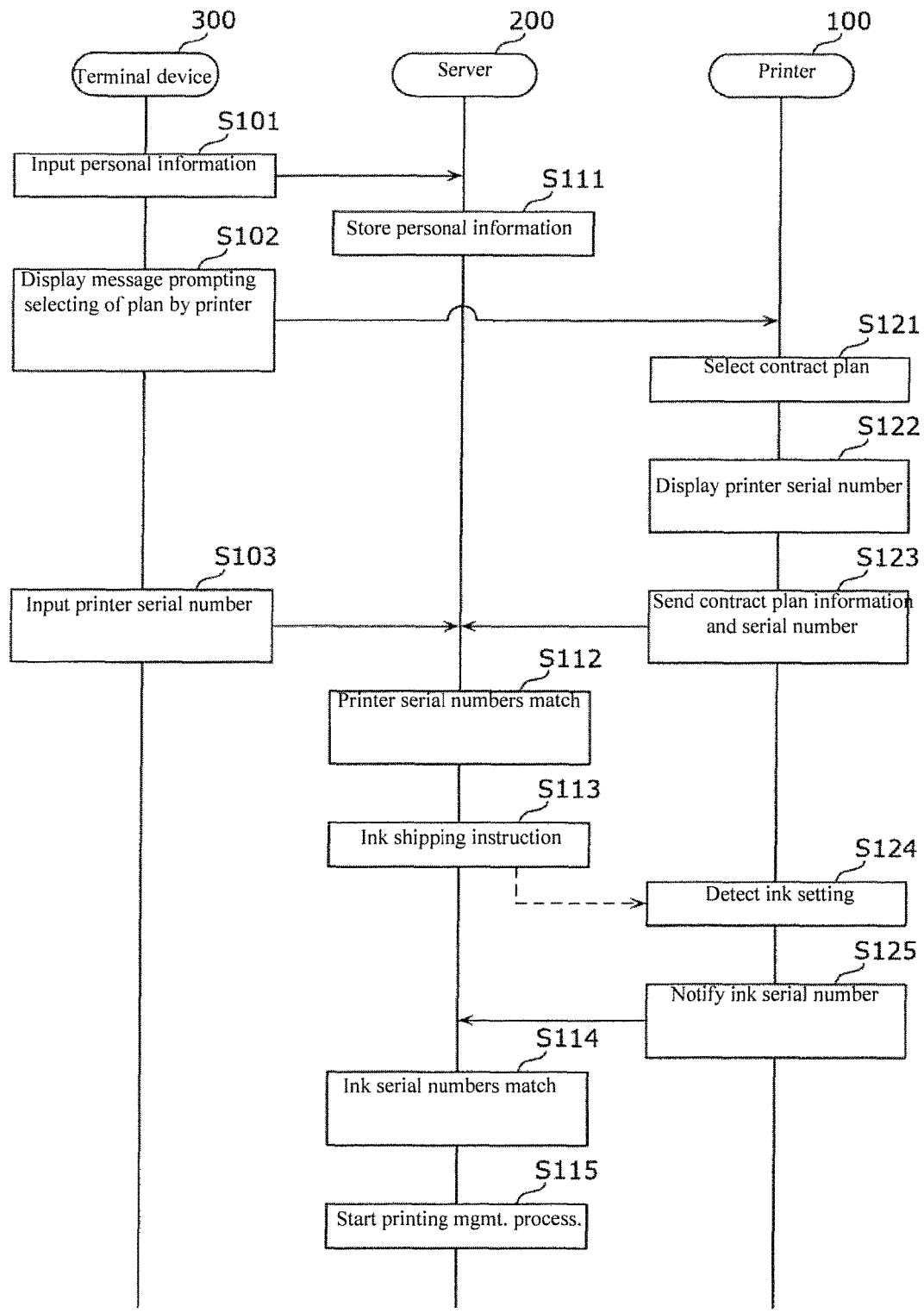
FIG. 5 is a sequence diagram for describing operations related to initializing the printer in the printing system according to one or more embodiments of the present invention.

FIG. 5 is a sequence diagram for describing operations relating to initializing the printer in the printing system.

First, at the terminal device 300, personal information of the user is input by the user (S101). For example, the user accesses the server 200 on a web browser started up on the terminal device 300 and inputs the personal information according to an input form provided from the server 200 that accepts input of personal information. The personal information input on the terminal device 300 is sent from the terminal device 300 to the server 200. The personal information is, for example, an address, a telephone number, an email address, a credit-card number, and the like.

At the server 200, the receiver 211 receives the personal information sent from the terminal device 300 and the received personal information is stored in the storage 215 (S111). As illustrated in FIG. 6, the personal information stored in the storage 215 is configured by, for example, an ID, a password, the address, the telephone number, the email address, the credit-card number, a serial number of the printer, and the like. Here, the ID and the password may be input by the user from the terminal device 300 or generated by the server 200. Moreover, associated as the serial number of the printer is a serial number of the printer determined as matching upon a comparison at step S112 that is described below. This may be input by the user from the terminal device 300 or input by the printer 100. Note that FIG. 6 is a diagram illustrating an example of the personal information stored in the storage of the server.

Next, at the terminal device 300, a message is displayed prompting selection of a contract plan on the printer 100 (S102) and an instruction is sent to the printer 100 to perform display whereby a contract plan is selected.

If an input indicating that a contract plan is selected by the user is accepted from the terminal device 300 (S121), the printer 100 displays the serial number of the printer 100 on a display that is not illustrated (S122). Then, the printer 100 sends information indicating the selected contract plan (contract-plan information) and information indicating the serial number of the printer 100 (serial-number information) to the server 200 (S123). Here, the server 200 may generate printer information such as that illustrated in FIG. 7 where the contract-plan information and the serial-number information acquired from the printer 100 are associated. The printer information may be made to be information where a serial number of the ink determined as matching upon a comparison at step S114 that is described below is further associated. Note that FIG. 7 is a diagram illustrating an example of the printer information stored in the storage of the server.

Meanwhile, the terminal device 300 displays the input form whereby input of the serial number of the printer 100 is accepted and accepts input of the serial number from the user (S103). The terminal device 300 sends information indicating the accepted serial number to the server 200.

The server 200 compares the serial number indicated by the information received from the printer 100 and the serial number indicated by the information received from the terminal device 300 and, if these match (S112), sends a shipping instruction of the ink to the logistics system 50 (S113). The shipping instruction of the ink includes, for example, the address of the user, a model of the printer 100, and the like. By this, the logistics system 50 delivers ink corresponding to the model of the printer 100 to this address of the user according to the shipping instruction of the ink.

Next, the printer 100, if it detects that the delivered ink is set therein (S124), reads the serial number of the set ink and notifies the server 200 of the serial number of the ink that is read (S125).

The server 200 compares the serial number of the ink delivered by the logistics system 50 and the serial number of the ink notified from the printer 100 (S114) and, if the serial numbers match, starts printing management processing (S115).

Next, operations of each device configuring the printing system 1 in a situation where the printer 100 is used are described.

Figure 8:
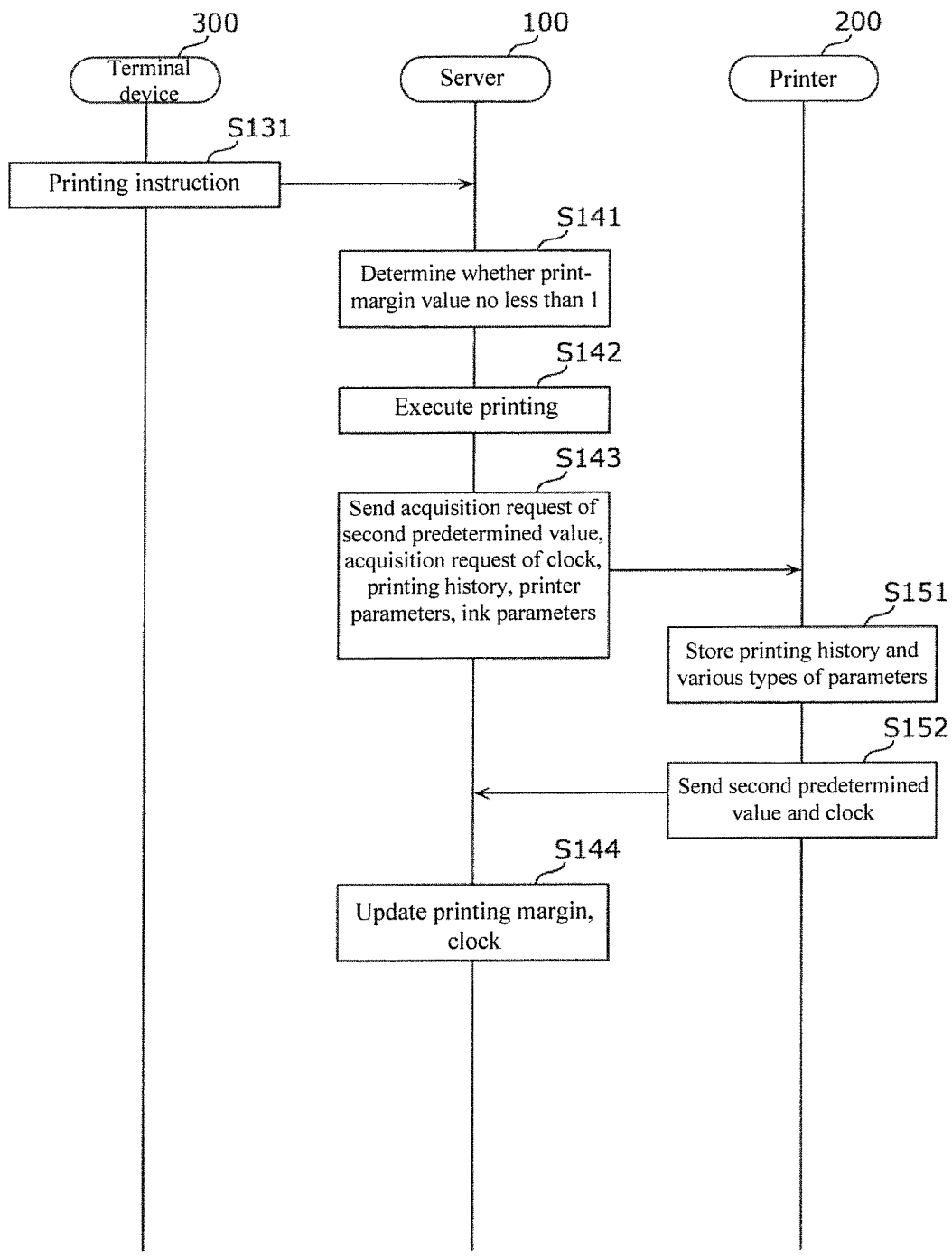
FIG. 8 is a sequence diagram for describing operations of printing processing during normal use of the printer in the printing system according to one or more embodiments of the present invention.

FIG. 8 is a sequence diagram for describing operations of printing processing during normal use of the printer in the printing system.

First, the printing processing is started by the user sending the printing instruction to the printer 100 from the terminal device 300 (S131).

At the printer 100, in a situation where the printing instruction receiver 111 acquires the printing instruction sent from the terminal device 300, the controller 112 determines whether the value of the printing margin held by the storage 115 is no less than 1 when the printing instruction receiver 111 acquires the printing instruction (S141).

Then, in a situation where, as a result of the determination, the value of the printing margin is no less than 1, the printer 100 executes printing (S142). Moreover, at the printer 100, printing is not executed in a situation where, as a result of the determination, the value of the printing margin is less than 1. That is, the printer 100 cannot perform printing in a situation where the value of the printing margin is 0. Note that details of the printing processing performed in the printer 100 are described below. Moreover, after executing printing, the printer 100 sends to the server 200 an acquisition request of the second predetermined value for updating the printing margin, an acquisition request of a clock, the printing history, the printer parameters, and the ink parameters (S143).

The acquisition request of the second predetermined value is, for example, information for the printer 100 to request the server 200 to send the second predetermined value. The second predetermined value is a value that the server 200 determines according to the number of printed sheets of the printer 100, the contract plan, information relating to a communication failure, a communication quality, and the like.

The acquisition request of the clock is, for example, information for requesting the server 200 to send an accurate time held by the server 200. By acquiring the clock from the server 200, a time held by the printer 100 can be updated to the accurate time acquired from the server 200.

The printing history is, for example, as illustrated in FIG. 9, a printing time when printing is performed, a sheet size used in the printing, a number of sheets of this printing (information on the number of sheets), color/black and white indicating whether this printing is color printing or black-and-white printing, printing success/failure indicating whether this printing succeeds or fails, and the like from when this printing is executed in the printer 100. That is, the printing history is the printing information indicating the status of printing executed in the printer 100. Note that FIG. 9 is a diagram illustrating an example of the printing history.

The printer parameters are, for example, an ISP (internet service provider) of the network to which the printer 100 is connected, a speed of this network, failure information indicating a number of failed connections to this network or an amount of time of failure, and the like.

Figure 10:
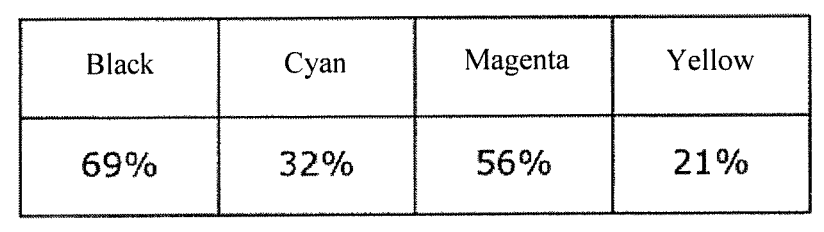

The ink parameters are information indicating the remaining amount of the ink set in the printer 100. For example, as illustrated in FIG. 10, the ink parameters are information indicating as a percentage a remaining amount of each color of the ink set in the printer 100. Note that FIG. 10 is a diagram illustrating an example of the ink parameters, which differ according to each color of the ink handled by the printer 100.

That is, the communication circuit 114 of the printer 100 may send to the server 200 the failure information indicating that communication with the server via the network is failed. The communication circuit 114 may send to the server 200 the information on the number of sheets, which indicates the number of sheets printed according to one printing instruction. The communication circuit 114 may send to the server 200 the identification information that identifies the ISP providing the network.

Returning to description of FIG. 8, the server 200 receives the acquisition request of the second predetermined value, the acquisition request of the clock, the printing history, the printing parameters, and the ink parameters and stores the received printing history, printing parameters, and ink parameters (S151).

Then, the server 200 sends the second predetermined value and the clock to the printer 100 (S152).

The printer 100 updates the value of the printing margin held by the storage 115 to the received second predetermined value and, by updating the held time thereof to the value of the received clock, synchronizes the time held by the printer 100 to the time held by the server 200 (S144).

Next, details of the operations of the printing processing in the printer 100 are described.

Figure 11:
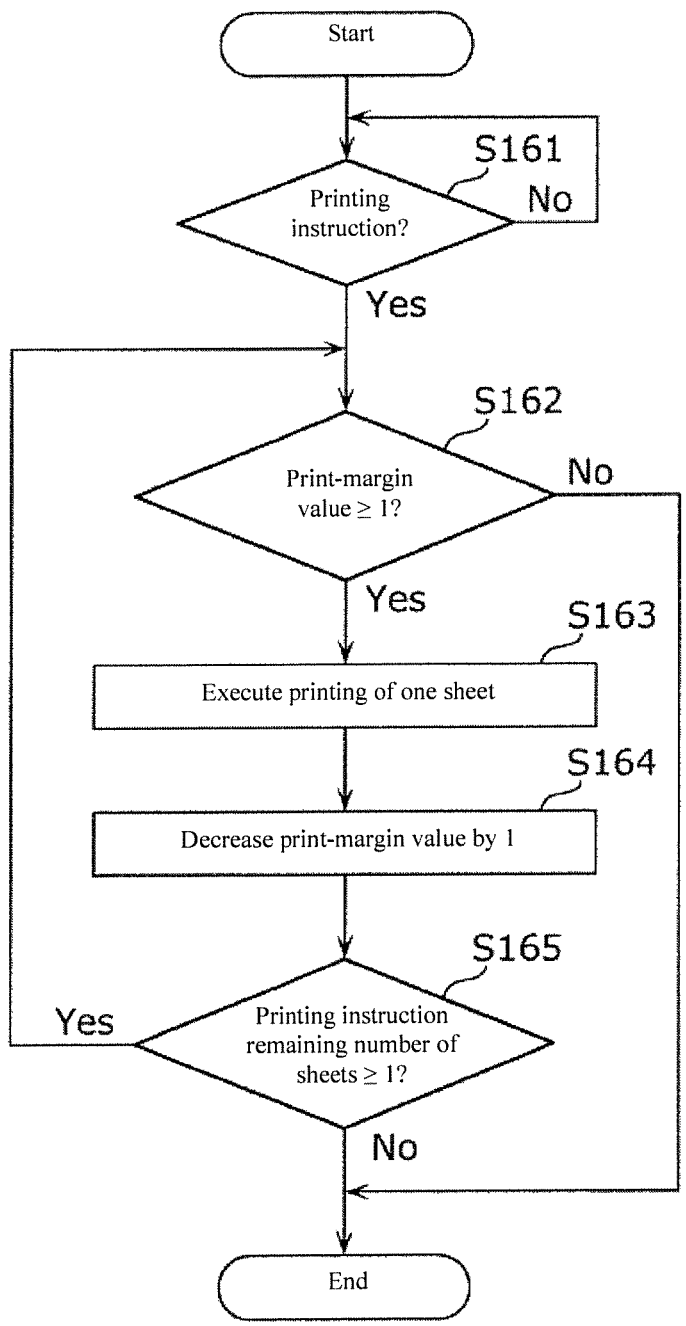
FIG. 11 is a flowchart illustrating the operations of the printing processing in the printer according to one or more embodiments of the present invention.

FIG. 11 is a flowchart illustrating the operations of the printing processing in the printer.

The printing instruction receiver 111 of the printer 100 determines whether the printing instruction is acquired (S161). The printing instruction receiver 111 of the printer 100 repeats this processing until the printing instruction is acquired.

With the printer 100, in a situation where the printing instruction receiver 111 acquires the printing instruction (Yes at S161), the controller 112 determines whether the value of the printing margin held by the storage 115 is no less than 1 (S162).

In a situation where the controller 112 determines that the value of the printing margin held by the storage 115 is no less than 1 (Yes at S162), the printing unit 113 of the printer 100 executes printing of one sheet (S163).

Because printing of one sheet is executed, the controller 112 of the printer 100 decreases the value of the printing margin by 1 (S164).

The controller 112 of the printer 100 determines whether a number of remaining sheets in the printing instruction is no less than 1 (S165). In a situation where the controller 112 determines that the number of remaining sheets in the printing instruction is no less than 1 (Yes at S165), the printer 100 returns to step S162 and repeats processing of the following steps S162 to S164 for printing the next page according to this printing instruction.

The printer 100 ends the printing processing in a situation where the controller 112 determines that the number of remaining sheets in the printing instruction is 0 (No at S165).

Furthermore, the printer 100 also ends the printing process in a situation where the controller 112 determines that the value of the printing margin is not no less than 1—that is, that the value of the printing margin is 0 (No at S162). That is, the printer 100 ends the printing processing even if printing according to the printing instruction is underway.

As above, the printer 100 counts and stores the number of sheets for which printing is executed in a situation where no communication connection is made. Then, after a communication connection is established, the printer 100 subtracts the number of sheets for which printing is executed in the situation where no communication connection is made from a number of printable sheets for the month in the contract plan for the printer 100 entered into by the user. Note that in the situation where a communication connection is established, the printer 100 may subtract the number of sheets for which printing is executed from the number of printable sheets each time printing is executed or store a number of sheets counted periodically and subtract the stored number of sheets from the number of printable sheets.

For example, suppose that in a situation where a remainder of a number of printable sheets of a user A is ten sheets and the printing margin is five sheets, the user A uses the terminal device 300 to make a printing instruction of three sheets before a communication connection is established. Because in this situation the printer 100 performs printing of the three sheets by consuming the printing margin of five sheets, a remaining printer margin becomes two sheets. At this time, the printer 100 stores that printing is performed for three sheets. Then, in a situation where a communication connection is established, the printer 100 subtracts the three sheets for which printing is performed from the ten sheets that is the number of printable sheets for seven sheets and updates and returns the value of the printing margin to the original value of five sheets.

Next, communication processing in the printer 100 with the server 200 is described.

Figure 12:
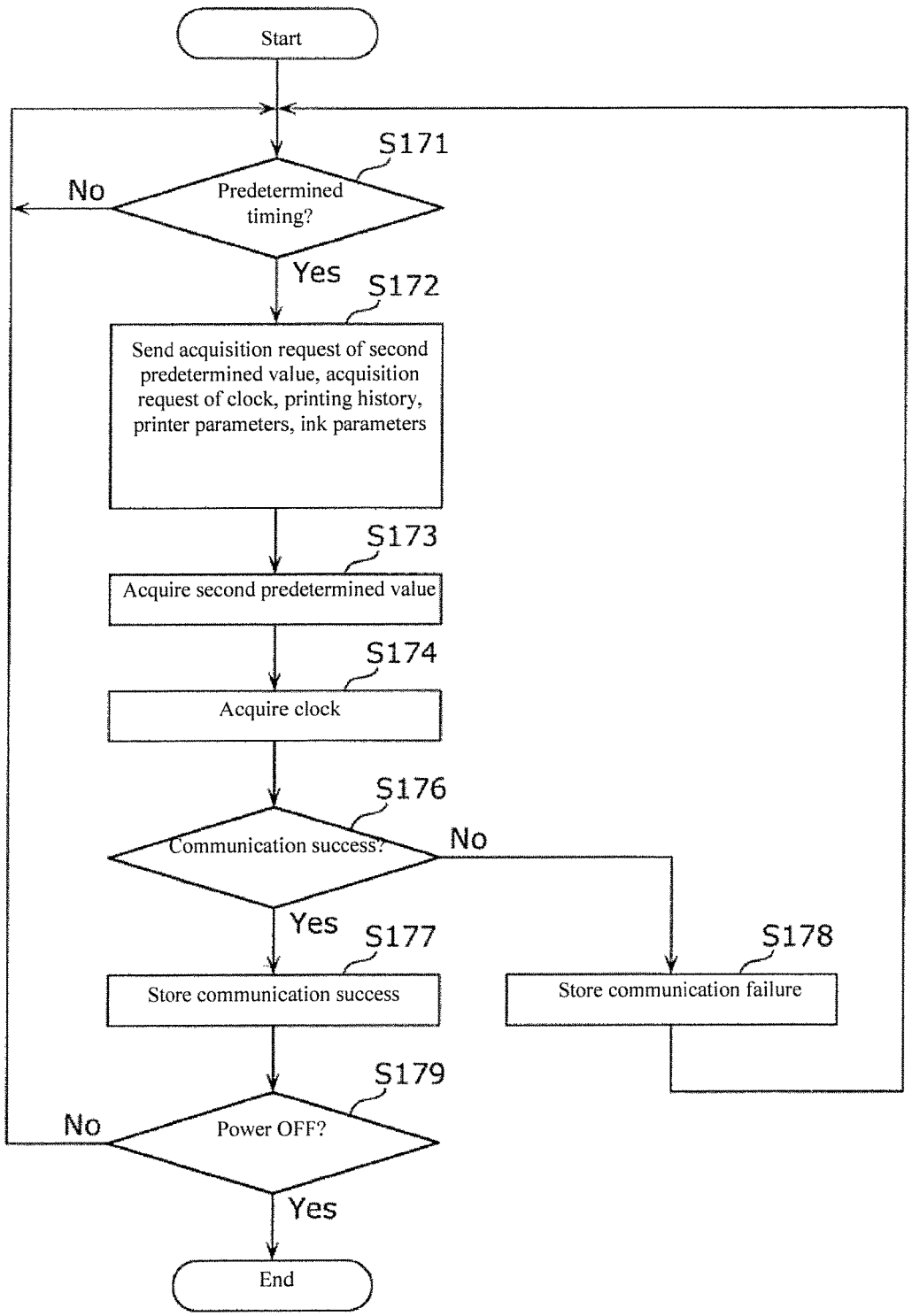
FIG. 12 is a flowchart illustrating operations of communication processing in the printer according to one or more embodiments of the present invention.

FIG. 12 is a flowchart illustrating operations of the communication processing in the printer.

The printer 100 determines whether a predetermined timing is had (S171). The predetermined timing is, for example, when a predetermined amount of time (for example, 1 hour) elapses, after printing is executed for one sheet, when the value of the printing margin held by the storage 115 becomes 0, when the ink 400 is set, when the time is lost (for example, when the power plug is unplugged), or when an error arises in the printer 100.

In a situation where it is determined that the predetermined timing is had (Yes at S171), the printer 100 performs the following steps S172 to S174 by communicating with the server 200. Specifically, the printer 100 performs processing of steps S143 and S144 from among the operations in FIG. 8 by communicating with the server 200.

The printer 100 determines whether all communication processing of steps S172 to S174 succeeds (S176). The printer 100 does not have to determine whether all communication processing of steps S172 to 174 succeeds and may make individual determinations.

In a situation where it is determined that all communications succeed (Yes at S176), the printer 100 stores that the communication processing are successful (S177). Specifically, the printer 100 stores that the communication processing performed at this timing are successful.

Furthermore, in a situation where it is determined that not all communication processing succeed (No at S176), the printer 100 stores that the communication processing fails (S178). Specifically, the printer 100 stores that the communication processing performed at this timing fails. Here, the stored information is held as the failure information above.

The printer 100 does not need to store the communication processing success in the situation of Yes at step S176; it is sufficient for it to store the communication processing failure of the situation of No at step S176.

The printer 100 repeats the operations of S171 to S178 until a main power is turned OFF (S179).

In the printer 100, the printing processing illustrated in FIG. 11 and the communication processing illustrated in FIG. 12 are performed in parallel. Because of this, in the printer 100, even if the value of the printing margin held by the storage 115 of the printer 100 decreases due to the printing processing being performed, by the following communication processing being performed, the value of the printing margin is updated to the acquired second predetermined value. That is, while the printer 100 is receiving the predetermined value that is described below from the server 200, the value of the printing margin decreased by the printing processing comes to increase to the predetermined value due to the communication processing.

Next, communication processing in the server 200 with the printer 100 is described.

Figure 13:
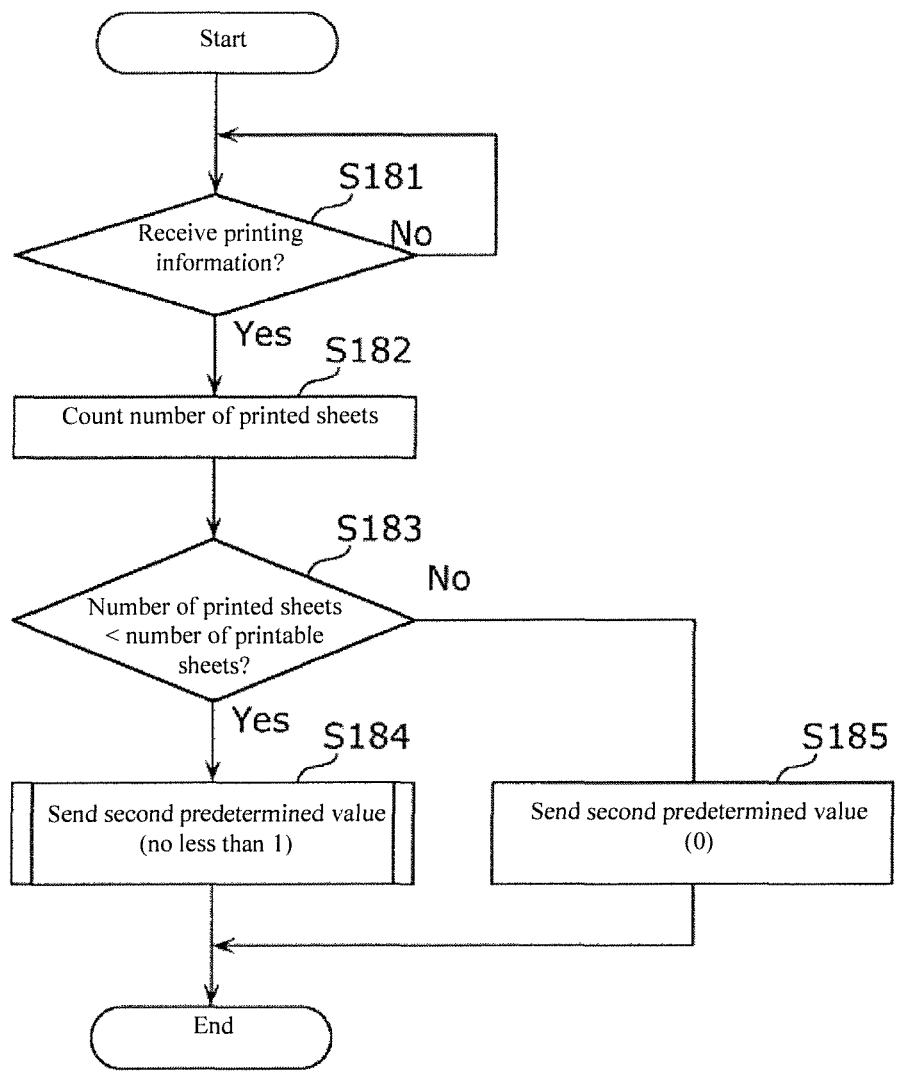
FIG. 13 is a flowchart illustrating operations of communication processing in the server according to one or more embodiments of the present invention.

FIG. 13 is a flowchart illustrating operations of the communication processing in the server.

The server 200 determines whether the receiver 211 receives the printing information (S181). The printing information is, specifically, information indicating the printing history. The server 200 repeats step S181 until the receiver 211 receives the printing information.

If it is determined that the receiver 211 receives the printing information (Yes at S181), the counting unit 213 of the server 200 counts the number of printed sheets printed by the printer 100 based on the received printing information (S182).

The determination unit 214 of the server 200 determines whether the number of printed sheets counted by the counting unit 213 is less than a predetermined number of printable sheets (S183). The predetermined number of printable sheets is associated with the printer 100 and is a number of sheets established by the contract plan. Specifically, the predetermined number of printable sheets is a number of printable sheets in a predetermined period; for example, it is 1,000 sheets in one month in a situation of a plan A as illustrated in FIG. 7, 2,000 sheets in one month in a situation of a plan B, and 4,000 sheets in one month in a situation of a plan C.

In a situation where as a result of the determination by the determination unit 214 the number of sheets printed in one month counted by the counting unit 213 is less than the predetermined number of printable sheets (Yes at S183), the transmitter 212 of the server 200 sends a value no less than 1 as the second predetermined value (S184). That is, in this situation, the transmitter 212 sends to the printer 100 the printability information indicating that printing is possible. Note that details of processing in the server 200 at step S184 of sending the second predetermined value that is a value no less than 1 are described below.

In a situation where as the result of the determination by the determination unit 214 the number of sheets printed in one month counted by the counting unit 213 is no less than the predetermined number of printable sheets (No at S183), the transmitter 212 of the server 200 sends 0 as the second predetermined value (S185). That is, in this situation, the transmitter 212 sends to the printer 100 the printability information indicating that printing is not possible.

By these configurations, the user can appropriately set the printing-margin value within an upper limit of the predetermined number of printable sheets.

Next, the processing in the server 200 of sending the second predetermined value that is a value no less than 1 is described.

Figure 14:
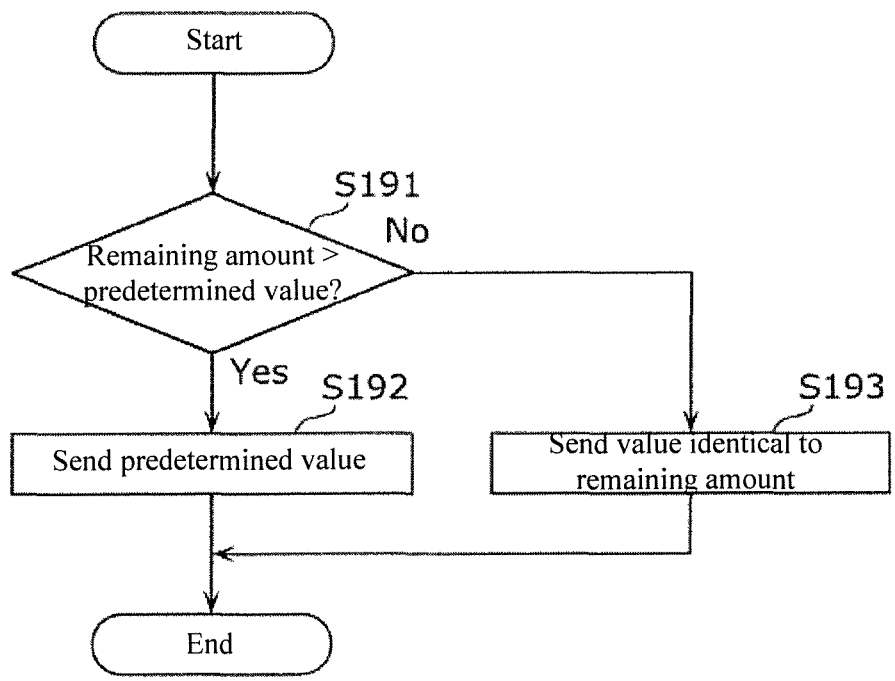
FIG. 14 is a flowchart illustrating processing in the server of sending an updated value that is a value no less than 1 according to one or more embodiments of the present invention.

FIG. 14 is a flowchart illustrating the processing in the server of sending the second predetermined value that is a value no less than 1.

The determination unit 214 of the server 200 determines whether a value of the number of remaining printable sheets, which is a value where the number of sheets (cumulative) printed in the month counted by the counting unit 213 is subtracted from the predetermined number of printable sheets for the month, is no less than a predetermined value (S191). The predetermined value is a value determined by the server 200 and is a value determined according to the printing history and the printing parameters received from the printer 100, the contract plan, and the like.

The predetermined value is set based on the failure information. Specifically, the predetermined value may be a value set to be large in the server 200 based on the failure information the server 200 receives from the printer 100. That is, the greater the number of times the printer 100 fails to communicate with the server 200 or the amount of time where this communication is failing, the greater a value to which the predetermined value is set by the server 200.

Because of this, the printing margin is updated to a value corresponding to the amount of time until the printer 100 is able to establish a communication connection with the server 200; therefore, printing can be continued even in a situation where communication is cut off. Moreover, because the value of the printing margin is set as an upper-limit value of printing, the printer does not acquire from the server the printability information indicating printability and the printer executing printing more than is necessary can be decreased.

Furthermore, the predetermined value may be a value in the server 200 set to be larger the greater the number of printed sheets indicated by the information on the number of sheets the server 200 receives from the printer 100 is. That is, the greater the number of printed sheets indicated by the information on the number of sheets included in the printing history received from the printer 100, the larger the value to which this may be set by the server 200. Because generally, the greater the number of printed sheets according to one printing instruction, the greater the number of printed sheets per unit time, it can be said that effects are had that are similar to those of a situation based on the failure information.

Furthermore, the predetermined value may be a value that is set to be larger the worse the quality of the network provided by the ISP indicated by the identification information that the server 200 receives from the printer 100 is. That is, the worse the quality of the network provided by the ISP indicated by the identification information received from the printer 100, the larger the value to which this may be set by the server 200. The server 200 holds information indicating the quality of the network of the ISP in advance for each ISP and may determine the predetermined value by referencing this information. Generally, the quality of the network is determined according to the ISP; because the worse the quality of the network, the more time is required when reconnecting, it can be said that effects are had that are similar to those of the situation based on the failure information.

Furthermore, the quality of the network is not limited to being determined by the ISP and may be determined according to a length of time from a point, in a state where communication is cut off, when establishing a communication connection is attempted to a communication connection being established (connection time). That is, the quality of the network may be determined to be worse the longer the length of the connection time is.

Furthermore, the predetermined value may be a value that is set to be larger the greater the number of printable sheets of the contract plan associated with the printer 100 is. That is, the greater the number of printable sheets of the contract plan associated with the printer 100, the larger the value to which this may be set by the server 200. Because it is generally thought that the greater the number of printable sheets, the greater a frequency of printing, the number of printed sheets per unit time tends to increase; therefore, it can be said that effects are had that are similar to those of the situation based on the failure information. The number of printable sheets in this situation may be the remaining amount of the number of printable sheets. That is, even in a contract where a number of printable sheets not printed in a previous month is carried over to the next month, the predetermined value may be determined according to the number of printable sheets added according to the carryover.

Furthermore, the predetermined value may be a value established in a contract separate from that of the number of printable sheets. That is, for example, there may be a contract plan where this predetermined value corresponding to the printer 100 is set as "10," a contract plan where this is set as "20," or a contract plan where this is set as "50."

The server 200 may determine the predetermined value according to a combination of at least no less than two from among the failure information, the information on the number of sheets, the ISP, and the number of printable sheets. That is, the server 200 may determine the predetermined value by determining a coefficient according to the failure information, the information on the number of sheets, the ISP, and the number of printable sheets respectively and multiplying a coefficient according to a combination of no less than two of the above with a predetermined reference value.

In a situation where the determination unit 214 determines that the remaining amount is no less than the predetermined value (Yes at S191), the transmitter 212 of the server 200 sends the predetermined value to the printer 100. For example, in a situation where the predetermined value is "10," the transmitter 212 sends "10" to the printer 100. In this situation, because the printer 100 receives "10" as the second predetermined value, the printing margin is updated to "10." That is, the printer 100 can execute printing of ten sheets even in a situation of not being able to acquire the printability information from the server 200.

In a situation where the determination unit 214 determines that the remaining amount is less than the predetermined value (No at S191), the transmitter 212 of the server 200 sends a value identical to the remaining amount to the printer 100. For example, in a situation where the predetermined value is "10" and the remaining amount of the number of printable sheets is "9," because the No determination is made at step S191, the transmitter 212 sends "9" to the printer 100. In this situation, because the printer 100 receives "9" as the second predetermined value, the printing margin is updated to "9." That is, with the printer 100, in a situation where the remaining amount of the number of printable sheets is less than the predetermined value, the printing margin is set to be a value identical to this remaining amount.

In this manner, the second predetermined value is set to this predetermined value in a situation where the remaining amount of the number of printable sheets according to the contract of the user is no less than the predetermined value and set to a value identical to this remaining amount in a situation where this remaining amount is less than this predetermined value. Because of this, a number of sheets greater than the number of printable sheets in the printer 100 being printed can be suppressed.

1-6. EFFECTS AND THE LIKE

According to the printer 100 according to one or more embodiments of the present invention, the printing unit 113 can execute printing according to the value of the printing margin held by the storage 115. Because of this, printing can be executed without taking up time in the printer 100, which performs printing by receiving printing authorization from the server 200.

Furthermore, when the printing unit 113 executes printing, the controller 112 decreases the value of the printing margin by the number of sheets for which printing is executed. Because of this, the printer 100 can stop execution of printing if the value of the printing margin becomes 0. Therefore, the printer 100 executing printing more than is necessary can be decreased even though the printer 100 does not acquire the printability information indicating printability from the server 200.

Furthermore, the controller 112 makes a determination each time printing for one sheet is performed. Because of this, the printer 100 can execute printing with the value of the printing margin as the upper limit.

Furthermore, the controller 112 updates the value of the printing margin to the second predetermined value when the communication circuit 114 acquires the second predetermined value from the server 200. That is, because the printer 100 can update the value of the printing margin to the value set in the server 200, if a communication connection is established with the server 200, the reduced value of the printing margin can be returned to the original value.

Furthermore, according to the server 200 according to one or more embodiments of the present invention, because the printer 100 can be made to update the value of the printing margin to the second predetermined value, control of printer 100 printability and control whereby the printer 100 can be made to execute printing even without the printer 100 acquiring the printability information from the server 200 can be readily performed.

1-7. FIRST MODIFIED EXAMPLE

In one or more embodiments of the present invention, the storage 115 holds 0 as the initial value but is not limited thereto and may hold a value no less than 1. That is, the storage 115 may hold a value no less than 1 as the value of the printing margin even if the communication circuit 114 has yet to even once with the server 200. Because of this, even if the quality of the network is in an adverse environment, initial printing of the printer 100 can be executed without taking up time. Therefore, printing can be readily executed.

1-8. SECOND MODIFIED EXAMPLE

Figure 15:
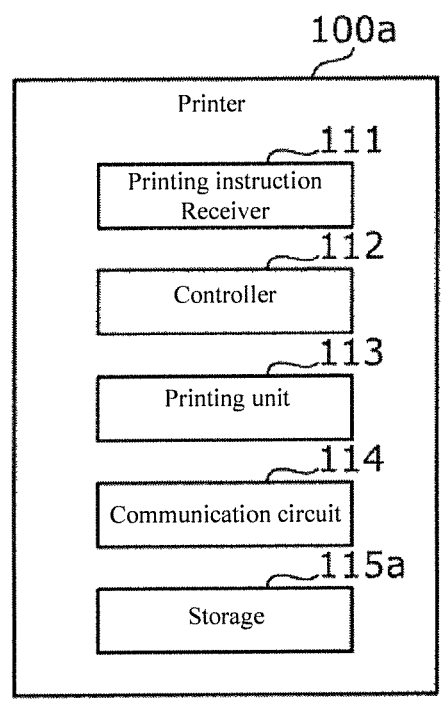
FIG. 15 is a block diagram illustrating an example of a functional configuration of a printer according to a second modified example of one or more embodiments of the present invention.

Not being limited to the configuration of the printer 100 according to one or more embodiments of the present invention, a printer 100a such as that illustrated in FIG. 15 provided with a storage 115a that stores a contract end time of the user in addition to the printing margin may be adopted. The storage 115a is realized by, for example, the memory 102 and the like. FIG. 15 is a block diagram illustrating an example of a functional configuration of a printer according to a second modified example of one or more embodiments of the present invention.

In this situation, the controller 112 makes the value of the printing margin 0 in a situation where it is further determined that the contract end time stored in the storage 115a is elapsed.

Figure 16:
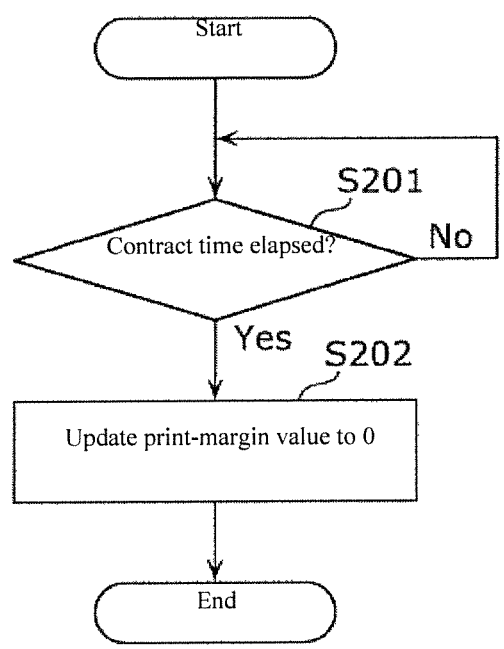
FIG. 16 is a flowchart illustrating an example of time-management processing of the printer according to the second modified example of one or more embodiments of the present invention.

FIG. 16 is a flowchart illustrating an example of time-management processing of the printer according to the second modified example of one or more embodiments of the present invention.

The controller 112 of the printer 100 determines whether the contract end time stored in the storage 115a is elapsed (S201).

If it is determined that the contract time is elapsed (Yes at S201), the controller 112 of the printer 100 updates the held value of the printing margin to 0 (S202). Meanwhile, if it is determined that the contract time is not elapsed (No at S201), the controller 112 of the printer 100 repeats step S201.

Because of this, the printer 100a can suppress printing being executed after a contract period is ended.

ANOTHER EXAMPLE

Printers according to one or more embodiments of the present invention are described above, but the present invention is not limited to thereto.

In one or more embodiments of the present invention, the printer 100 is made to be an inkjet printer but may be a laser printer. In this situation, a toner cartridge is delivered instead of an ink cartridge.

Furthermore, each device above may be configured as a computer system configured specifically from a microprocessor, a ROM, a RAM, a hard disk drive, a display unit, a keyboard, a mouse, and the like. A computer program is stored in the RAM or the hard disk drive. Each device achieves a function thereof by the microprocessor operating according to the computer program. Here, the computer program is configured by a combination of a plurality of command codes indicating instructions to a computer for achieving a predetermined function.

Furthermore, a portion or an entirety of the components configuring each device above may be configured from one system LSI (large-scale integration). The system LSI is a super-multifunctional LSI manufactured by stacking a plurality of configuring units on one chip and includes a computer system configured including, for example, a microprocessor, a ROM, a RAM, and the like. In this situation, the computer program is stored in the ROM. The system LSI achieves a function thereof by the microprocessor operating according to the computer program.

Furthermore, a portion or an entirety of the components configuring each device above may be configured from an IC card or stand-alone module that is removable from each device. The IC card or the module is a computer system configured form a microprocessor, a ROM, a RAM, and the like. The IC card or the module may include the super-multifunctional LSI above. The IC card or the module achieves a function thereof by the microprocessor operating according to the computer program. This IC card or module may have anti-tampering properties.

Furthermore, one or more embodiments of the present invention may be the methods illustrated above. One or more embodiments of the present invention may be a computer program that realizes these methods by a computer or a digital signal consisting of this computer program.

Furthermore, one or more embodiments of the present invention may be a recording of the computer program above or the digital signal above on a computer-readable, non-temporary recording medium—for example, a flexible disk, a hard disk, a CD-ROM, an MO, a DVD, a DVD-ROM, a DVD-RAM, a BD (Blu-ray (registered trademark) Disc), a semiconductor memory, or the like. Moreover, it may be the digital signal above recorded on these non-temporary recording media.

Furthermore, one or more embodiments of the present invention may be a transmission of the computer program above or the digital signal above via a telecommunication line; a wireless or wired communication line; a network, the internet being representative thereof; a data broadcast; or the like.

Furthermore, one or more embodiments of the present invention may be a computer system provided with a microprocessor and a memory, the memory storing the computer program above and the microprocessor operating according to the computer program above.

Furthermore, it may be implemented by another independent computer system by recording the program above or the digital signal above on the non-temporary recording medium above and transferring this or by transferring the program above or the digital signal above via the network or the like above.

Furthermore, one or more embodiments of the present invention above and one or more of the modified examples of one or more embodiments of the present invention may be respectively combined. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

One or more embodiments of the present invention maybe useful as, for example, a printer that performs printing by receiving printing authorization from a server and can execute printing without taking up time.

1 Printing system
10 Residence
20 Card company
30 Operating company
40 Ink factory
50 Logistics system
100, 100a Printer
101 Processor
102 Memory
103 Drive motor
104 Printer head
105 Communication I/F
106 USB I/F
111 Printing instruction receiver
112 Controller
113 Printing unit
114 Communication circuit
115, 115a Storage
200 Server
201 Processor
202 Memory
203 Storage
204 Communication I/F
211 Receiver
212 Transmitter
213 Counting unit
214 Determination unit
215 Storage
300 Terminal device
400 Ink

What is claimed is:

1. A printer comprising:
a transceiver that communicates with an external device and that receives a printing instruction;
a processor that determines a printing amount based on a state of the communication with the external device;
a printing unit that executes printing based on the printing instruction and the printing amount; and
a storage that stores first printing information;
wherein the transceiver is configured to receive second printing information from the external device,
wherein the processor determines the printing amount based on any one from among the first printing information and the second printing information, and
wherein, if the transceiver is not receiving the second printing information from the external device, the processor determines the printing amount based on only the first printing information.

2. The printer according to claim 1, wherein the processor determines the printing amount based on the first printing information during a time until the transceiver receives the second printing information.

3. The printer according to claim 2,
wherein the first printing information includes a first predetermined value representing a number of printable sheets, and
wherein the printing unit, when the processor determines that a value of the first predetermined value is no less than a predetermined value, performs printing based on the determination.

4. The printer according to claim 3, wherein the determination is performed for each execution of the printing.

5. The printer according to claim 3, wherein the greater a number of times the printer fails to communicate with the external device or an amount of time where the communication is failing, the greater a value to which the predetermined value is set by the external device.

6. The printer according to claim 3, wherein the greater a number of printed sheets indicated by information on a number of sheets included received from the printer, the greater a value to which the predetermined value is set by the external device.

7. The printer according to claim 3, wherein the processor updates the first predetermined value based on a number of times of the printing.

8. The printer according to claim 7, wherein the processor sends the updated value to the external device based on a request from the external device.

9. The printer according to claim 7, wherein the updated value is a value where the number of times of the printing is subtracted from the first predetermined value.

10. The printer according to claim 7,
wherein the second printing information includes printability information, and
wherein the printing unit:
executes the printing in a situation where the printability information includes printable-status information; and
does not execute the printing in a situation where the printability information includes non-printable-status information.

11. The printer according to claim 10,
wherein the transceiver acquires the printability information, which includes a second predetermined value, from the external device, and
wherein the processor updates the updated value to the second predetermined value.

12. The printer according to claim 11,
wherein the printability information includes the printable-status information if the second predetermined value is no less than a predetermined value, and
wherein the printability information includes the non-printable-status information if the second predetermined value is less than the predetermined value.

13. The printer according to claim 11, wherein the second predetermined value is a value determined based on at least one of a number of printed sheets of the printer, a contract plan of a user, information relating to a communication failure, and a communication quality.

14. The printer according to claim 1, wherein the state indicates whether or not a connection with the external device is established.

15. The printer according to claim 1, wherein the state indicates whether or not the printer receives printable-status information from the external device.

16. A printing system comprising:
a terminal device that transmits a printing instruction;
a server; and
a printer that receives the printing instruction,
wherein the printer communicates with the server,
wherein the printer determines a printing amount based on a state of the communication with the server, and
wherein the printer executes printing based on the printing instruction and the printing amount,
wherein the printer stores first printing information;
wherein the printer is configured to receive second printing information from the server,
wherein the printer determines the printing amount based on any one from among the first printing information and the second printing information, and
wherein, if the printer is not receiving the second printing information from the server, the processor determines the printing amount based on only the first printing information.

17. The printer according to claim 16, wherein the printer determines the printing amount based on the first printing information during a time until the printer receives the second printing information.

18. The printer according to claim 17,
wherein the first printing information includes a first predetermined value representing a number of printable sheets, and
wherein the printer, when the printer determines that a value of the first predetermined value is no less than a predetermined value, performs printing based on the determination.

* * * * *

UNITED STATES PATENT AND TRADEMARK OFFICE
CERTIFICATE OF CORRECTION

PATENT NO. : 10,223,043 B2
APPLICATION NO. : 15/726430
DATED : March 5, 2019
INVENTOR(S) : Takehiro Onomatsu It is certified that error appears in the above-identified patent and that said Letters Patent is hereby corrected as shown below:

On the Title Page

Item (56), under "Other Publications," the corresponding application number of the European Patent Application in which the Extended European Search Report was issued should read --17195202.1-- rather than "171952021".

Signed and Sealed this
Eleventh Day of June, 2019

Andrei Iancu
*Director of the United States Patent and Trademark Office*